Figure 1:
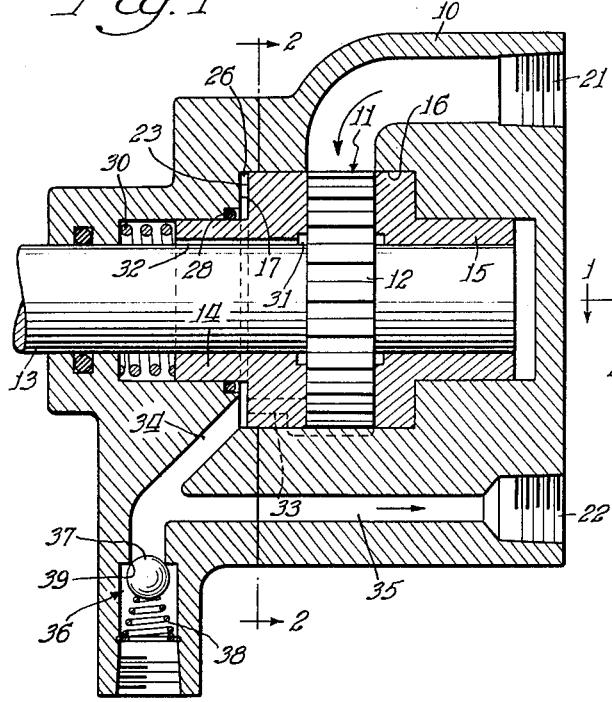

Dec. 8, 1959  J. D. CAMPBELL  2,915,977
FIXED FLOW PUMP
Filed Dec. 13, 1954

Inventor:
John D. Campbell
By: Joseph R. Dwyer
Atty.

2,915,977
Patented Dec. 8, 1959

2,915,977
FIXED FLOW PUMP

John D. Campbell, Shaker Heights, Ohio, assignor to Borg-Warner Corporation, Chicago, Ill., a corporation of Illinois Application December 13, 1954, Serial No. 474,957

7 Claims. (Cl. 103—42)

My invention relates in general to fluid pumps, and more particularly to a new and improved fluid pump arranged to supply a fixed flow of fluid continuously to one or more utilization devices requiring a uniform rate of fluid flow at a predetermined pressure. My invention is adapted for providing hydraulic operation of a plurality of accessory devices in an automotive vehicle, such as steering boost mechanisms, window wiper operators, window opening and closing mechanisms and seat-positioning mechanisms but is especially adapted for use in connection with steering boost mechanisms.

It has long been realized that the many problems encountered in the design of pumps for use in connection with accessories, such as steering boost mechanisms, has long remained unsolved, and it has been heretofore necessary in certain instances that the prior art pumps have additional motors and/or driving means connected thereto so that the pump could be driven at a constant rotational speed regardless of the speed of the vehicle—a very uneconomical and unsatisfactory solution. In other instances where prior art devices have been directly connected to the automotive engine to be driven in accordance with the rotational speed of the drive shaft of the latter, innumerable difficulties have resulted because the variation in the rotational speed of the drive shaft of the engine caused the pump to fluctuate in its output pressure and flow. To overcome these difficulties, various supplementary devices, such as multiple clutches, governors, by-pass valves and the like have been added. Obviously, such prior art devices are not economical and are exceedingly difficult to service and maintain.

In this connection, it is well recognized that, in present-day automotive vehicles, it is desirous to supplement the manual force required to steer the vehicle with additional booster mechanisms making it easier for the driver to handle and control the vehicle. Experience has shown, however, that the manual power usually required to steer and control the vehicle is usually greater when the vehicle is standing or being parked or at low speeds, as it is at higher speeds. It is apparent, therefore, that it is desirable to have a pump, for supplying a flow of fluid to the steering booster mechanism and directly connected to the automotive engine to be driven in unison therewith, able to supply such an accessory at a predetermined constant flow irrespective of the speed of the engine so that the driver may have hydraulic power assistance when the manual power requirements are the greatest, i.e., at parking and idling speeds. Thus, my invention seeks as its major accomplishment the provision of a pump which can be connected to an automotive engine so as to be driven in unison therewith yet deliver a fixed or uniform rate of flow at a predetermined pressure to the hydraulically actuated power steering boost mechanism regardless of the rotational speed of the engine shaft.

Accordingly, my invention has as its preliminary objects the provision of an improved pump capable of supplying a constant rate of flow of fluid at a predetermined pressure to a fluid actuated accessory regardless of the extremely wide and frequent variation of the rotational speeds of the driving means for the pump and also to simplify its construction and its mode of operation as compared to conventional type pumps used for this purpose.

An additional object of my invention is the provision of a new and improved pump which is especially designed to supply an automotive vehicle accessory with a fixed flow of fluid at a constant pressure regardless of the rotational speed of the automotive engine drive shaft to which the pump impeller can be connected to rotate in unison therewith.

Still another accomplishment of my invention is to provide a new and improved pump especially adapted for power boost steering mechanisms in automotive vehicles which is particularly characterized by its simplified construction and which eliminates all unnecessary supplemental mechanisms such as clutch, governors, by-pass valves, etc., heretofore connected to prior art pumps in order to regulate the flow of the fluid discharged by these prior art pumps.

Still another object of my invention is to provide a new and improved pump especially adapted for supplying fluid to fluid actuated mechanisms in automotive vehicles, the construction of which is particularly characterized by embodying within the pump itself means for regulating its output to provide a fixed flow of fluid to the automotive accessory regardless of the rotational speed of the automotive engine to which it can be connected.

Still another object of my invention, in one embodiment thereof, is to provide a new and improved gear type pump which will deliver a fixed rate of flow of fluid at a predetermined pressure to a hydraulic actuator in an automotive vehicle requiring such uniform flow.

Still another object in my invention, in another embodiment, is to provide a vane type pump which would deliver a uniform rate of flow to fluid to a hydraulic actuator in an automotive vehicle requiring such uniform flow.

Briefly, my invention, in one embodiment thereof, comprises an improvement in a gear type pump of the pressure loaded type constructed in accordance with the teachings of the U.S. Patent No. 2,420,622 to Roth et al. and wherein there is provided a restricted orifice between the discharge side of the pumping gears and the pressure loading chamber containing the pressure acting upon the rear or motive surfaces of the bushings to urge the latter into sealing engagement with the gear side faces whereby on increase in the rotational speed of the pumping gears the pressure upstream of the restricted orifice will increase causing the bushings to move away from the associated gear side faces when the upstream pressure reaches a pre-determined maximum amount, allowing the excess fluid to by-pass back to the inlet so that there is always a constant of uniform flow through the orifice and ultimately to the discharge outlet of the pump.

Figure 2:
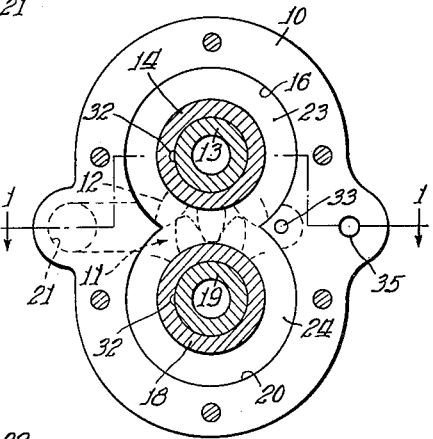

Other and more particular objects, advantages and accomplishments of my invention will become apparent from a reading of the following specification taken in connection with the appended drawings forming a part thereof and wherein:

Fig. 1 is a top plan view, in section, showing to advantage the detailed arrangement of a pressure loaded gear type pump constructed in accordance with one embodiment of my invention; and Fig. 2 is a sectional view along line 2—2 of Fig. 1.

Referring now to the drawings, numeral 10 denotes a suitably chambered pump housing in which are rotatably mounted a pair of intermeshing pumping gears, indicated in their entirety by reference numeral 11. Driving gear 12 of the pair of gears 11 is supported on a shaft 13 journalled on its left end through a pressure responsive, axially movable bushing 14 and on its right end through a fixed body bushing 15 and extends out through the housing to be suitably connected to any driving means (not shown). The gear 12 and associated bushings 14 and 15 are arranged in a first chamber 16 formed in the pump housing 10 with sufficient clearance between the left end of bushing 14 and the adjacent wall 17 of the housing to permit axial movement of the bushing 14. Similarly, the intermeshing driven gear (not shown) has disposed on its left side a pressure responsive axially movable bushing 18 (Fig. 2) and on its right a fixed body bushing (not shown). Driven shaft 19, upon which the driven gear is mounted, is journalled through the axially movable bushings 18 and its associated body bushing in a manner identical with the driving shaft 12. The driven gear and associated bushings are located in a second chamber 20 formed in the housing adjacent and parallel to chamber 16. Sufficient clearance is provided between the right end of the axially movable bushing 18 and the adjacent end wall of the housing to permit axial movement of the bushing 18.

As shown in Figure 1 of the drawings, the housing has an inlet port or conduit 21 and an outlet port or conduit 22. Low pressure fluid is introduced into the pump housing 10 at the inlet 21 and high pressure fluid is discharged from the housing through outlet 22.

In the operation of the pump of this type, a portion of the discharge pressure generated by the intermeshing gears 11 is communicated from the outlet or discharge side thereof to the annular pressure loading or motive surface areas at the back of the bushings, designated at 23 and 24 in the drawings. Motive surface areas 23 and 24 cooperate with the adjacent walls (the adjacent wall spaced from motive surface area 23 is indicated at Figure 1 as 17) of the housing bores 16 and 20, respectively, and the bushings to define behind each bushing annular pressure loading or motive pressure chambers; chamber 26 behind pressure loaded bushing 14 being shown in Figure 1. The escape of pressure rearwardly of the pressure loading chambers is substantially prevented by means of an O-ring seal 28 disposed about the periphery of the rear portion of each bushing in a suitable annular groove formed in the periphery of the bushing or in the adjacent bore wall. Pressure leaking past the O-ring seal may be vented to inlet pressure or to a zone of intermediate pressure in accordance with conventional pressure loaded pump practice as set forth in the above-referred-to Roth et al. patent.

To provide an initial sealing relationship between the bushings and the gear side faces, coiled compression springs are disposed within the right ends of the pressure loading chambers (only one compression spring 30 being shown in Figure 1) so as to seat against the terminal ends of the bushings to urge the forward surfaces of the bushings into engagement with the gear side faces.

In the usual pressure loaded pump constructed in accordance with the teachings of the aforementioned Roth et al. Patent 2,420,622, relief recesses, such as 31, are formed in each of the radially inner portions of the forward or gear engaging surfaces of the pressure loadable bushings 14 and 18, or in the gear side faces, and are placed in communication with a pressure lower than discharge pressure generated by the pump through a clearance between the gear journals and the bushing bores or by specific grooves or channels 32 extending axially of the inner cylindrical surfaces of the bore of the bushings. These recesses control the effective pressure area relationship between the rear or motive surfaces and the forward gear engaging surfaces of the pressure loading bushings, the area and size of these recesses being determined in any particular pump so as to control the effective pressure in such a manner that the axial forces resulting from the pressure generated by the pump acting against the forward gear side engaging surfaces of the bushings 14 and 18 tending to produce an axial movement of the bushings away from the gear side faces are effectively controlled and overcome by the oppositely directed loading forces acting against the rear or motive surfaces of the bushings, which latter axial forces are made, in practice, to slightly exceed the first mentioned axial forces and thereby maintain proper sealing engagement with the gear side faces.

As hereinbefore mentioned, since it is desirable in certain applications to drivingly connect the driving shaft 13 to the driving means which may vary in its rotational speed and accordingly vary the rotational speed of the driving shaft 13 and vary the output of the intermeshing gears in harmony therewith some provision must be made to regulate the output flow of the pump to efficiently drive a fluid actuated device requiring uniform flow of fluid thereto. Thus, in a typical installation of a gear pump in an automotive vehicle wherein the driving shaft 13 is connected to the vehicle engine to be driven in unison therewith, the driving shaft 13 will cause the intermeshing gears 11 to vary the fluid flow output according to the speed of rotation of the drive shaft of the vehicle. Such a variable rate of flow of the fluid is undesirable to drive automotive accessories, particularly, as a steering boost mechanism which requires a uniform rate of flow of fluid thereto for efficient operation.

Accordingly, it is a purpose of my invention as hereinbefore mentioned, to provide in a pressure loaded pump of the type herein described a means which will provide a fixed flow of fluid at a predetermined pressure through the pump discharge outlet, during the entire operation of the pump, irrespective of the speed of rotation of pumping gears. This flow regulating means comprises a restricted orifice formed in communication with the discharge of the pumping gears through which is communicated the entire flow of fluid produced by the pumping gears to the pressure loading or pressure motive chambers formed at the rear of the axially movable pressure loadable bushings and communicating the motive chambers with the discharge outlet of the pump whereby the entire flow of the pump cooperates to provide an upstream pressure adjacent the discharge area of the pumping gears and a downstream pressure area in the motive pressure chambers to effectively maintain in cooperation of the axially movable pressure loadable bushings a fixed rate of flow out the discharge outlet of the pump as will be more fully explained hereinafter.

More particularly, in the embodiment shown in Figs. 1 and 2, a restricted orifice 33 is formed in the housing 10 adjacent the discharge area of the pumping gears 11 and extends in an axial direction to the intercommunicating motive pressure chambers such as 26 shown in Fig. 1, to communicate the entire flow discharged by the intermeshing gears to these chambers. Obviously, restricted orifice 33 could likewise be formed in the bushings themselves to effectively communicate flow to the pressure loading chambers if desired. Discharge passages 34 and 35 place the intercommunicating motive pressure chambers in communication with the discharge outlet port 22 and there is provided, between discharge passages 34 and 35, a relief valve assembly, indicated in its entirety as 36, and shown in Fig. 1 as a ball poppet 37 with loading spring 38 arranged to seat the ball poppet 37 against valve seats 39. Relief valve assembly 36 functions to relieve any excess pressure in the discharge passage in the conventional manner.

In the usual operation of pressure loaded pumps of the type herein described, fluid introduced into inlet port 21 is discharged by rotation of the pumping gears 11 through outlet port 22 and a portion of the discharge pressure is communicated to the rear or motive surface of the pressure loadable bushings to urge the latter into sealing engagement with the gear side face. It is important to point out that my present invention is distinguished in its structure and mode of operation from the conventional pressure loaded type pumps by communicating the entire discharge flow caused by the rotation of the intermeshing gears 11 through the restricted orifice 33 into the intercommunicating motive pressure chambers and ultimately out through the discharge port 22 by way of discharge passages 34 and 35. As a consequence, the restricted orifice 33 cooperates with the flow of fluid discharged by the intermeshing gears to form an upstream pressure zone on the forward gear engaging surfaces of the bushings and a downstream pressure zone on the rear or motive surfaces of the bushings, i.e., in the motive pressure chambers. The pressure in the upstream zone tends to urge the bushings away from the gear side faces in opposition to the downstream pressure in the motive pressure chambers which tends to urge the bushing into sealing engagement with the gear side face. It is evident, that as the flow of fluid discharged by the pumping gears increases due to increased rotation of the pumping gears, the upstream pressure will increase and, at a certain predetermined pressure value, will cause the bushings to move axially out of engagement with the gear side faces. This latter condition will cause the fluid on the discharge side of the pumping gears to return to the inlet of the pump across the gear side faces, thus effectively regulating the total flow of fluid to the orifice and ultimately to the discharge port 22.

In a typical example of the operation of a pump constructed in accordance with the teachings of my invention, it can be seen that if such a pump is to be drivingly connected in an automotive vehicle to be driven by the vehicle engine, the pump can be so constructed and arranged to discharge a predetermined volume of fluid at engine idling speed, for example, to a steering boost mechanism. Accordingly, during further operation of the automotive vehicle, speed of the vehicle engine increases with consequent increase in flow from the discharge side of the pumping gears which tends to increase the upstream pressure and will cause the bushings to move axially away from the pumping gear side faces and by-pass the excessive fluid back to the pump inlet with the result that the rate of flow of fluid discharged from the pump outlet port is substantially the same as the rate of flow from the outlet port when the vehicle engine was idling.

From the foregoing disclosure, it may be observed that I have provided a new and improved pump which effectively fulfills the objectives and accomplishments as hereinbefore set forth and which may be summarized as follows:

(1) Structurally simple and efficient;
(2) Economical to manufacture and readily adaptable to manufacturing principles; and
(3) Adaptable to replace conventional prior art pump assemblies particularly where the problem of connecting the pump to a variable speed drive is involved.

Wherein the various parts of my invention have been referred to as located in the right or left position or in an upper or lower position, it will be understood that this is done solely for the purpose of facilitating description and such references relate only to the relative position of the parts as shown in the accompanying drawings.

While I have illustrated the preferred embodiments of my invention, many modifications may be made without departing from the spirit of the invention, and do not wish to be limited to the precise details of construction set forth, but wish to avail myself of all changes within the scope of the appended claims.

I claim:

1. In a fixed flow, variable speed pump, a housing, means defining an inlet and an outlet in said housing, means defining a pumping chamber in said housing, a rotatable pumping means in said chamber for drawing fluid from said inlet, pressurizing the same, and forcing the pressurized fluid from said pumping chamber, an axially movable backing plate for said chamber and having a front surface adapted to sealably engage said pumping means and thereby provide one side of said chamber, said backing plate having a pressure receiving back surface forming together with means including a portion of said housing a pressure control chamber, means defining a passage interconnecting said pumping chamber and said pressure control chamber and having a flow restriction means therein, said flow restriction means being so constructed and arranged that the entire output of said pumping means flows therethrough into and through said pressure control chamber and thereby establishes a pressure differential between said pumping chamber and said control chamber relative to flow whereby the force of the pressure fluid in said control chamber acting against said back surface of said backing plate is sufficient to maintain said front surface in said sealing engagement in opposition to the force of the pressure fluid in said pumping chamber acting against said front surface and tending to move said backing plate from said sealing engagement until the pressure in said pumping chamber reaches a predetermined value causing said backing plate to move from said sealing engagement, and means defining a passage interconnecting said pressure control chamber with said outlet.

2. In a fixed flow, variable speed pump, a housing, means defining an inlet and an outlet in said housing, means defining a pumping chamber in said housing, a rotatable pumping means in said chamber for drawing fluid from said inlet, pressurizing the same, and forcing the pressurized fluid from said pumping chamber, an axially movable backing plate for said chamber and having a front surface adapted to sealably engage said pumping means and thereby provide one side of said chamber, said backing plate having a pressure receiving back surface forming together with means including a portion of said housing a pressure control chamber, means defining a restricted orifice interconnecting said pumping chamber and said pressure control chamber and so constructed and arranged that the entire output of said pumping means flows therethrough into and through said pressure control chamber and thereby establishes a pressure differential between said pumping chamber and said control chamber relative to flow whereby the force of the pressure fluid in said control chamber acting against said back surface of said backing plate is sufficient to maintain said front surface in said sealing engagement in opposition to the force of the pressure fluid in said pumping chamber acting against said front surface and tending to move said backing plate from said sealing engagement until the pressure in said pumping chamber reaches a predetermined value causing said backing plate to move from said sealing engagement, and means defining a passage interconnecting said pressure control chamber with said outlet.

3. A fixed flow, variable speed fluid pump having a suction side, a discharge side, means defining a pumping chamber, a rotatable pumping member in said pumping chamber for drawing fluid from said inlet, pressurizing the same, and forcing the pressurized fluid from said pumping chamber, an axially movable, pressure loadable end plate having a pressure responsive motive surface, said end plate being movable with respect to said pumping member and engageable at a front surface opposite to said motive surface with an adjacent side face of said pumping member in sealing relation to provide one side of said pumping chamber, means interconnecting said pumping chamber and said motive surface and directing the entire flow of fluid from said discharge side to said motive surface, said means being so constructed and arranged to establish a pressure differential between said discharge side and said motive surface relative to flow whereby the force of the pressure fluid acting against said motive surface of said end plate is sufficient to maintain said front surface in said sealing relation in opposition to to the force of the pressure fluid in said pumping chamber acting against said front surface and tending to move said end plate from said sealing relation until the pressure of the fluid of said discharge side of said pumping member reaches a predetermined value causing said end plate to move from said sealing relation, and means interconnecting the fluid acting on said motive surface with an outlet.

4. A fixed flow, variable speed fluid pump having a suction side, a discharge side, means defining a pumping chamber, a rotatable pumping member in said pumping chamber for drawing fluid from said inlet, pressurizing the same, and forcing the pressurized fluid from said pumping chamber, an axially movable pressure loadable end plate having a pressure responsive motive surface, said end plate being movable with respect to said pumping member and engageable at a front surface opposite to said motive surface with an adjacent side face of said pumping member in sealing relation to provide one side of said pumping chamber, means defining a flow restriction interconnecting said pumping chamber and said motive surface and being so constructed and arranged that the entire flow of fluid from said discharge side passes therethrough to said motive surface and thereby establishes a pressure differential between said discharge side and said motive surface relative to flow whereby the force of the pressure fluid acting against said motive surface of said end plate is sufficient to maintain said front surface in said sealing relation in opposition to the force of the pressure fluid in said pumping chamber acting against said front surface and tending to move said end plate from said sealing relation until the pressure of the fluid of said discharge side of said pumping member reaches a predetermined value causing said end plate to move from said sealing relation, and means interconnecting the fluid acting on said motive surface with an outlet.

5. A fixed flow, variable speed fluid pump having a suction side, a discharge side, means defining a pumping chamber, a rotatable pumping member in said pumping chamber for drawing fluid from said inlet, pressurizing the same, and forcing the pressurized fluid from said pumping chamber, an axially movable, pressure loadable end plate having a pressure responsive motive surface, said end plate being movable with respect to said pumping member and engageable at a front surface opposite to said motive surface with an adjacent side face of said pumping member in sealing relation to provide one side of said pumping chamber, means defining a restricted orifice interconnecting said pumping chamber and said motive surface and so constructed and arranged that the entire flow of fluid from said discharge side passes therethrough to said motive surface and thereby establishes a pressure differential between said discharge side and said motive surface relative to flow whereby the force of the pressure fluid acting against said motive surface of said end plate is sufficient to maintain said front surface in said sealing relation in opposition to the force of the pressure fluid in said pumping chamber acting against said front surface and tending to move said end plate from said sealing relation until the pressure of the fluid of said discharge side of said pumping member reaches a predetermined value causing said end plate to move from said sealing relation, and means interconnecting the fluid acting on said motive surface with an outlet.

6. A fixed flow, variable speed fluid pump having a suction side, a discharge side, means defining a pumping chamber, a rotatable pumping member in said pumping chamber for drawing fluid from said inlet, pressurizing the same, and forcing the pressurized fluid from said pumping chamber, an axially movable, pressure loadable end plate having a pressure responsive motive surface, said end plate being movable with respect to said pumping member and engageable at a front surface opposite to said motive surface with an adjacent side face of said pumping member in sealing relation to provide one side of said pumping chamber, means defining a restricted orifice interconnecting said pumping chamber and said motive surface and so constructed and arranged adjacent said discharge side that the entire flow of fluid from said discharge side passes therethrough to said motive surface whereby the fluid in said discharge side forms an upstream pressure and the fluid acting on said motive surface forms a downstream pressure across said resrticted orifice, the force of the pressure fluid acting against said motive surface of said end plate being sufficient to maintain said front surface in said sealing relation in opposition to the force of the pressure fluid in said pumping chamber acting against said front surface and tending to move said end plate from said sealing relation until said upstream pressure reaches a predetermined value relative to flow, and means interconnecting the fluid acting on said motive surface with an outlet.

7. In a fixed flow, variable speed, pressure loaded pump of the type comprising a housing having an inlet and an outlet formed therein, means defining a pumping chamber in said housing, a pair of intermeshing pumping gears rotatably journalled in said housing and disposed in said pumping chamber for drawing fluid from said inlet, pressurizing the same, and forcing the pressurized fluid from said pumping chamber, an axially movable pressure loadable plate associated with each of said gears and having a forward sealing surface thereon adapted to engage the associated gear side face in sealing relation, each plate being axially movable with respect to its associated pumping gear, means defining a motive surface on each plate oppositely disposed with respect to said sealing surface, means defining a restricted orifice interconnecting said pumping chamber and said motive surfaces and so constructed and arranged that the entire output of said pump flows therethrough to said motive surfaces and thereby establishes a pressure differential between said pumping gears and said motive surfaces relative to flow whereby the force of the pressure fluid acting against said motive surfaces of said end plates is sufficient to maintain said forward surfaces in said sealing relation in opposition to the force of the pressure fluid in said pumping chamber acting against said forward surfaces and tending to move said end plates from said sealing engagement until the pressure of said output of said pumping gears reaches a predetermined value causing said end plates to move from said sealing relation, and means interconnecting said motive surfaces with said outlet whereby the entire output of said pumping gears is first directed to said motive surfaces and secondly to said outlet.

References Cited in the file of this patent

UNITED STATES PATENTS

| | | |
|---|---|---|
| 2,420,622 | Roth et al. | May 13, 1947 |
| 2,544,987 | Gardiner et al. | Mar. 13, 1951 |
| 2,544,988 | Gardiner et al. | Mar. 13, 1951 |
| 2,600,632 | French | June 17, 1952 |
| 2,600,633 | French | June 17, 1952 |
| 2,642,802 | Gardiner | June 23, 1953 |
| 2,742,862 | Banker | Apr. 24, 1956 |

FOREIGN PATENTS

| | | |
|---|---|---|
| 625,405 | Germany | Feb. 8, 1936 |